US010602872B2

(12) United States Patent
Liu

(10) Patent No.: US 10,602,872 B2
(45) Date of Patent: Mar. 31, 2020

(54) LIQUID-CONTAINING CONTAINER WITH FILTER PLATE

(71) Applicant: Free-Free Industrial Corp., Taipei (TW)

(72) Inventor: Sheng-Yu Liu, Taipei (TW)

(73) Assignee: FREE-FREE INDUSTRIAL CORP., Taipei (TW)

(*) Notice: Subject to any disclaimer, the term of this patent is extended or adjusted under 35 U.S.C. 154(b) by 384 days.

(21) Appl. No.: 15/458,542

(22) Filed: Mar. 14, 2017

(65) Prior Publication Data

US 2018/0146814 A1 May 31, 2018

(30) Foreign Application Priority Data

Nov. 28, 2016 (TW) .............................. 105139060 A

(51) Int. Cl.
*A47J 31/14* (2006.01)
*A47J 31/18* (2006.01)
*A47G 19/12* (2006.01)
*A47J 31/44* (2006.01)

(52) U.S. Cl.
CPC .......... *A47J 31/14* (2013.01); *A47G 19/127* (2013.01); *A47J 31/18* (2013.01); *A47J 31/4403* (2013.01); *A47J 31/4407* (2013.01)

(58) Field of Classification Search
CPC .. A47J 31/14; A47J 31/18; A47J 31/20; A47J 31/4403; A47J 31/4407; A47J 31/446; A47J 31/4464; A47J 31/4467; A47J 31/4471; A47G 19/127; A47G 19/14; A47G 19/145; A47G 19/16

USPC ........................................................... 99/279
See application file for complete search history.

(56) References Cited

U.S. PATENT DOCUMENTS

| 1,758,407 | A | * | 5/1930 | Parkinson | A47G 19/14 99/317 |
|---|---|---|---|---|---|
| 1,847,879 | A | * | 3/1932 | Knecht | A47G 19/2211 138/103 |
| 4,494,668 | A | * | 1/1985 | Lottick | A47G 19/2266 215/229 |
| 2010/0288773 | A1 | * | 11/2010 | Chuang | A47G 19/127 220/506 |
| 2011/0056385 | A1 | * | 3/2011 | McLean | A47J 31/20 99/297 |
| 2012/0216682 | A1 | * | 8/2012 | Bodum | A47J 31/20 99/297 |

(Continued)

*Primary Examiner* — Tu B Hoang
*Assistant Examiner* — Erin E McGrath
(74) *Attorney, Agent, or Firm* — Chun-Ming Shih; HDLS IPR Services

(57) ABSTRACT

A container is adapted to contain a liquid and separate solids from the liquid. The container includes a body, a cover unit, and a ring-shaped filter plate. The body defines a receiving space adapted for receiving the liquid therein, and has a top opening and a pouring opening in spatial communication with the receiving space. The cover unit includes a cover member removably covering the top opening, and an insert member extending downwardly from the cover member into the receiving space. The filter plate is disposed in the receiving space at a position below the pouring opening, is sleeved on one of a bottom portion of the cover member and a top portion of the insert member, and is adapted for filtering out the solids during passage of the liquid therethrough.

6 Claims, 4 Drawing Sheets

(56) References Cited

U.S. PATENT DOCUMENTS

| | | | | |
|---|---|---|---|---|
| 2014/0048510 A1* | 2/2014 | Kilduff | ............... | B65D 81/18 |
| | | | | 215/387 |
| 2017/0049260 A1* | 2/2017 | Beber | ................. | A47J 31/20 |
| | | | | 99/317 |

* cited by examiner

LIQUID-CONTAINING CONTAINER WITH FILTER PLATE

CROSS-REFERENCE TO RELATED APPLICATION

This application claims priority of Taiwanese Patent Application No. 105139060, filed on Nov. 28, 2016.

FIELD

The disclosure relates to a container, and more particularly to a pitcher that has a filter plate.

BACKGROUND

Referring to FIG. 1, a conventional pitcher includes a pitcher body 11, a cover member 12, a cooling rod 13, and a handle 14 disposed on the pitcher body 11. The pitcher body 11 defines a receiving space 15 adapted for receiving a liquid (not shown) (e.g., herbal tea) therein, and has a pouring opening 16 in spatial communication with the receiving space 15. The cover member 12 removably covers a top end of the pitcher body 11. The cooling rod 13 protrudes downwardly from the cover member 12 into the receiving space 15, and can be placed in advance into a refrigerator or a freezer for cooling. When in use, after the cover member 12 covers the top end of the pitcher body 11, the pre-cooled cooling rod 13 is inserted into the receiving space 15 through the cover member 12 for cooling the liquid.

However, when pouring the liquid out of the pouring opening 16 into a cup, solids (not shown) (e.g., tea leaves) may also be poured out together with the liquid. Before a person drinks the liquid in the cup, it is desired to remove the solids in the cup to prevent chocking, thereby causing inconvenience to the person.

SUMMARY

Therefore, an object of the disclosure is to provide a pitcher that can alleviate at least one of the drawbacks associated with the abovementioned prior art.

Accordingly, the pitcher is adapted to contain a liquid, and is adapted to separate solids from the liquid. The pitcher includes a pitcher body, a cover unit, and a filter plate. The pitcher body defines a receiving space that is adapted for receiving the liquid therein. The pitcher body has a top opening and a pouring opening that are in spatial communication with the receiving space. The cover unit includes a cover member and an insert member. The cover member removably covers the top opening of the pitcher body. The insert member extends downwardly from the cover member into the receiving space. The filter plate is ring-shaped, is disposed in the receiving space at a position below the pouring opening of the pitcher body, is sleeved on one of a bottom portion of the cover member and a top portion of the insert member, and is adapted for filtering out the solids during passage of the liquid therethrough.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
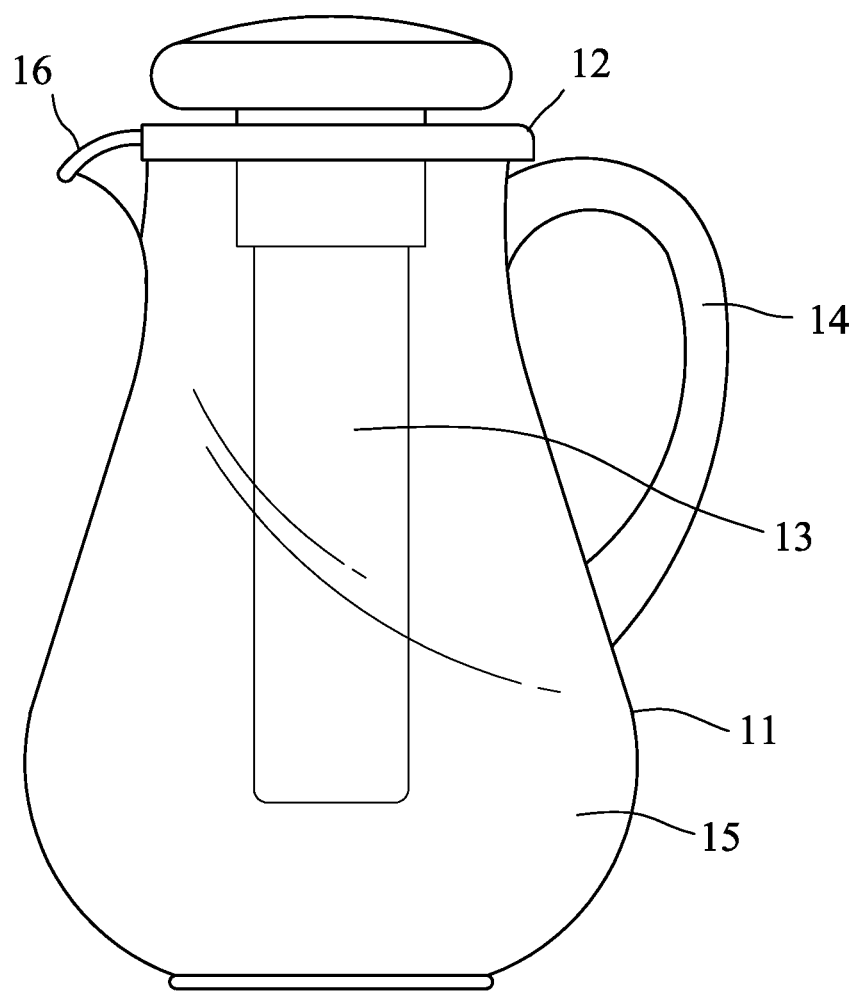
FIG. 1 is a side view of a conventional pitcher.
Figure 2:
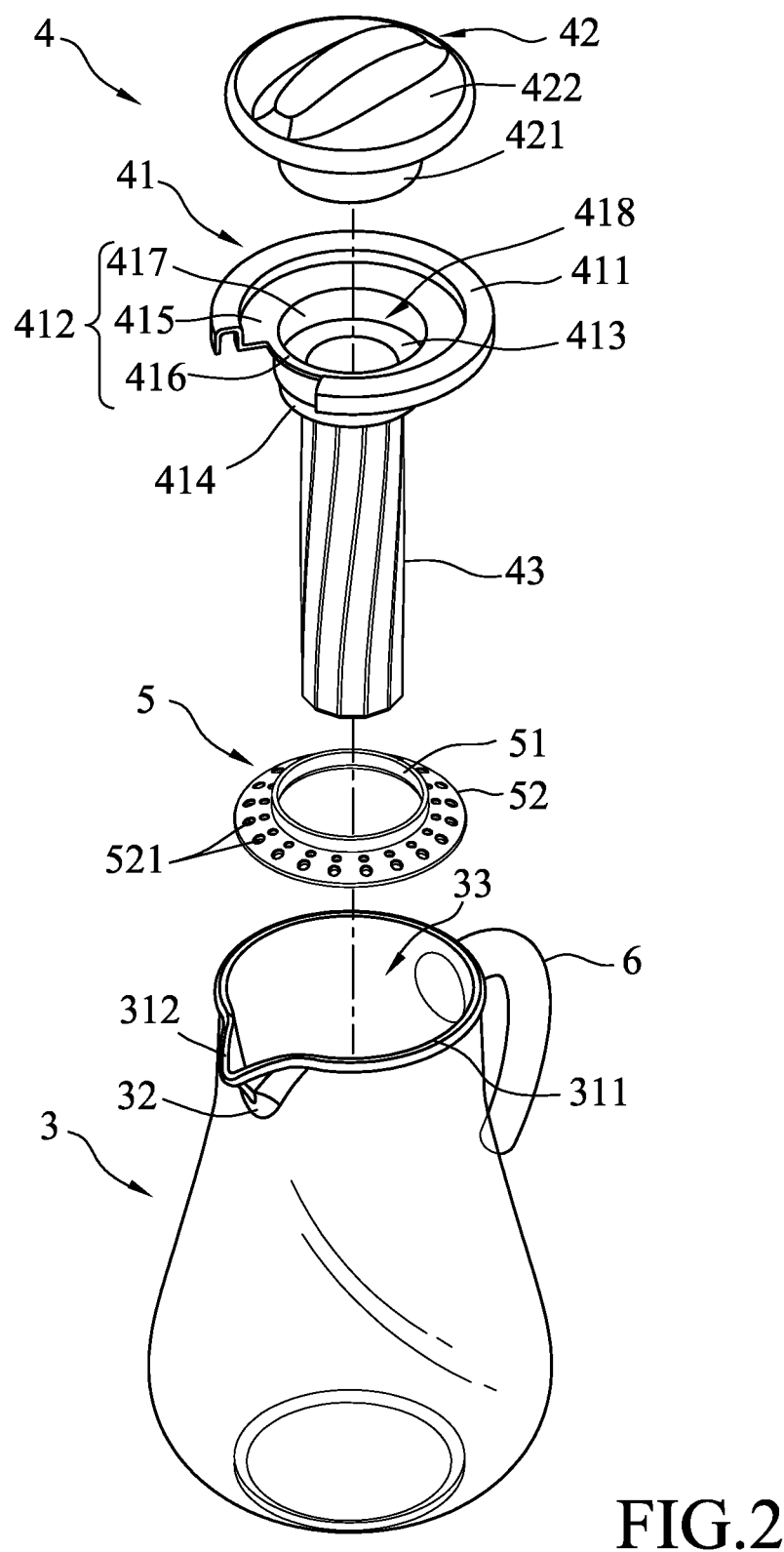
FIG. 2 is an exploded perspective view of an embodiment of a pitcher according to the preset disclosure.
Figure 3:
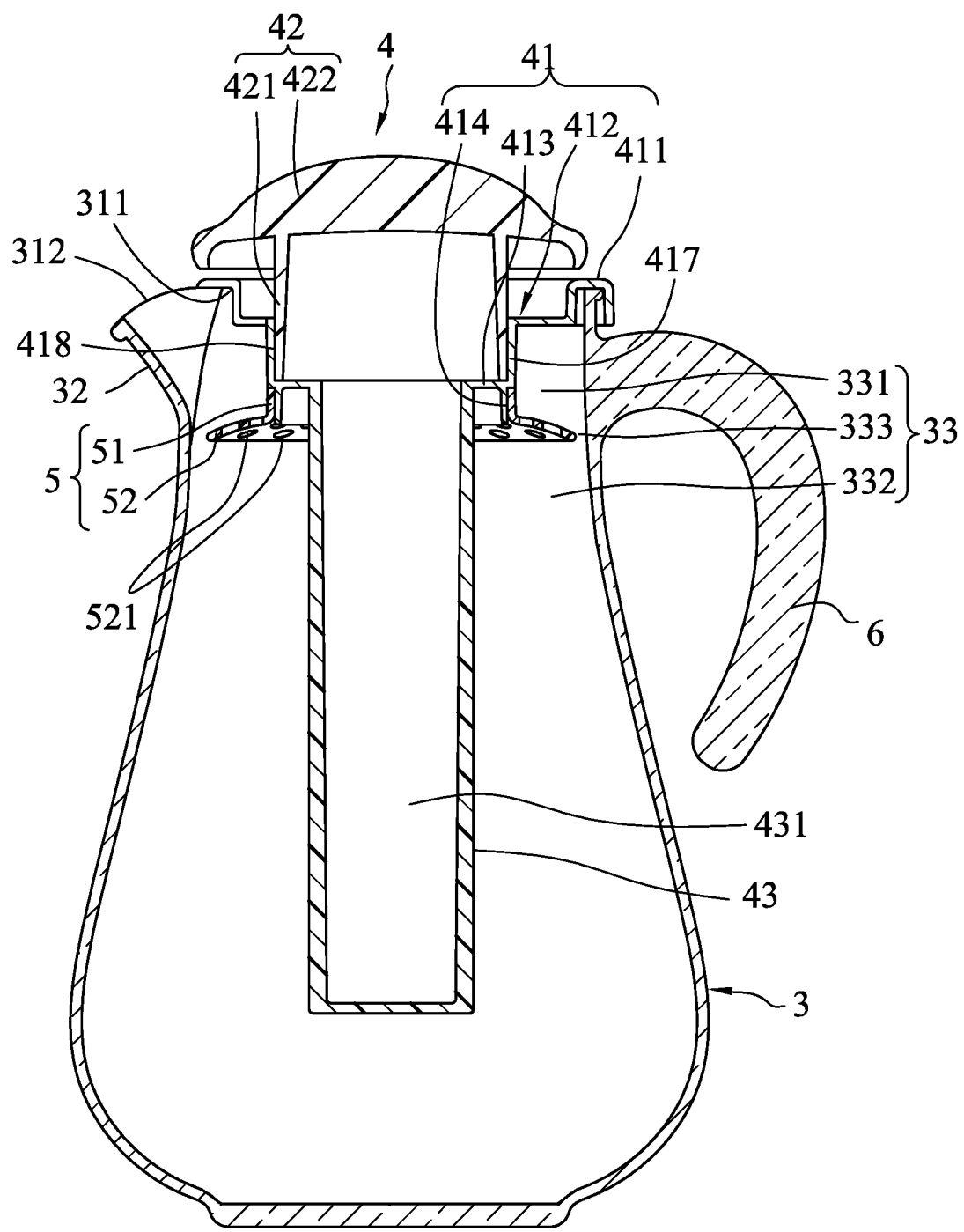
FIG. 3 is a sectional view of the embodiment.
Figure 4:
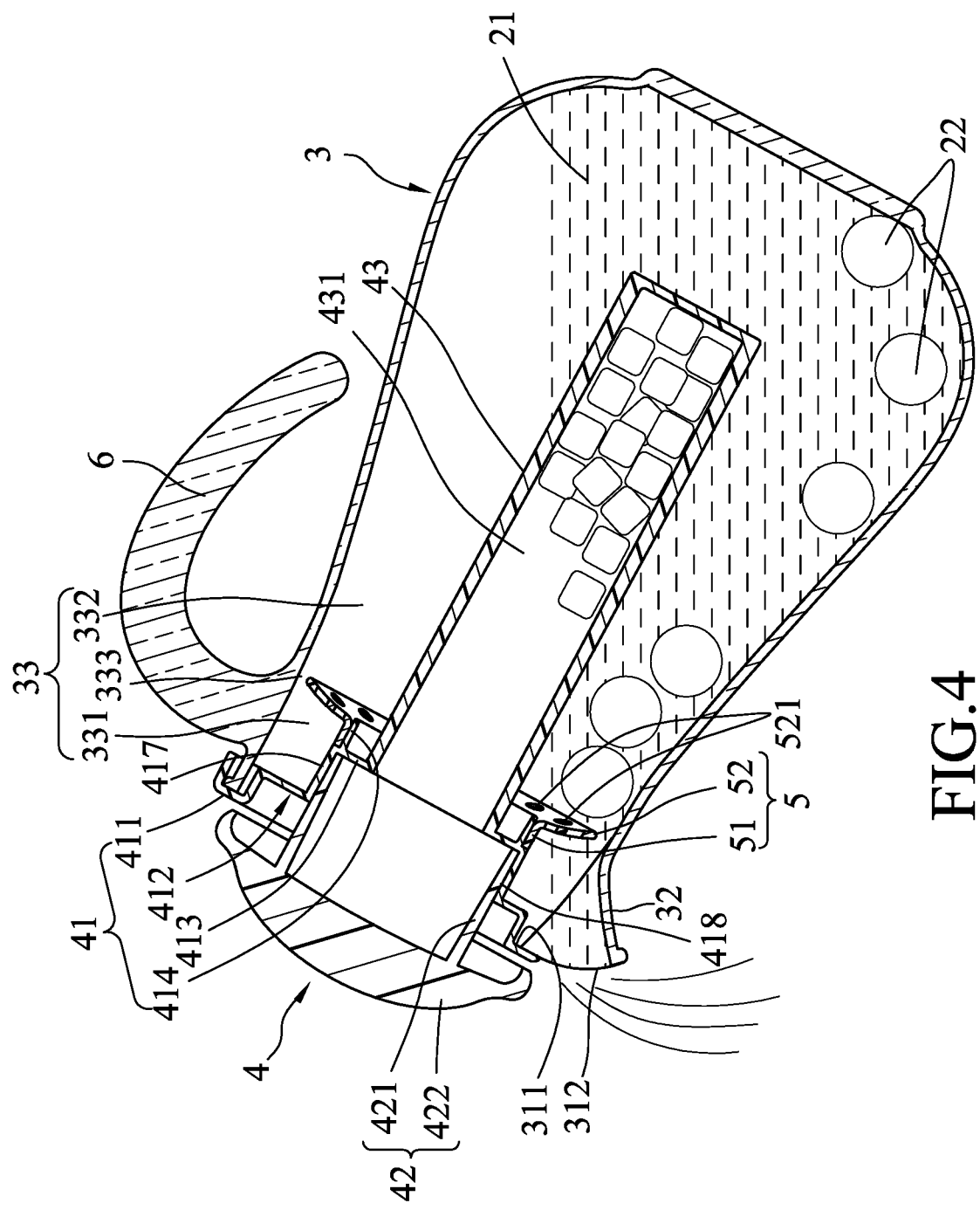
FIG. 4 is another sectional view, illustrating a liquid in the pitcher being poured out via a pouring opening of the embodiment.

Referring to FIGS. 2 to 4, an embodiment of a pitcher according to the present disclosure is adapted to contain a liquid 21 (e.g., herbal tea), and is adapted to separate solids 22 (e.g., tea leaves, stalks, etc.) from the liquid 21. The pitcher has a pitcher body 3, a cover unit 4, a ring-shaped filter plate 5, and a handle 6.

The pitcher body 3 defines a receiving space 33 that is adapted for receiving the liquid 21 therein. The pitcher body 3 has a top opening 311 formed at a top end of the pitcher body 3, and a spout 32 defining a pouring opening 312. The top opening 311 and the pouring opening 312 are in spatial communication with the receiving space 33. In this embodiment, the pouring opening 312 is located at the top end of the pitcher body 3 and is directly connected to the top opening 311.

The cover unit 4 includes a cover member 41, a protective lid 42, and an insert member 43. The cover member 41 removably covers the top opening 311 of the pitcher body 3. The cover member 41 includes an engaging wall 411, an upper surrounding wall 412, a shoulder wall 413, and a lower surrounding wall 414. The engaging wall 411 has an inverted U-shaped cross section so as to engage the top end of the pitcher body 3, and further has a C-shaped form that opens toward the pouring opening 312 of the pitcher body 3. The upper surrounding wall 412 has a C-shape portion 415, a ring portion 416, and an extension portion 417. The C-shaped portion 415 extends inwardly from a lower end of the engaging wall 411, and has a C-shaped form that opens toward the pouring opening 312 of the pitcher body 3. The ring portion 416 extends inwardly from an inner edge of the C-shaped portion 415. The extension portion 417 extends downwardly from an inner edge of the ring portion 416.

The shoulder wall 413 extends inwardly from the extension portion 417 of the upper surrounding wall 412, and cooperates with the extension portion 417 to define a retaining space 418. The lower surrounding wall 414 extends downwardly from the shoulder wall 413, and is offset inwardly relative to the extension portion 417 of the upper surrounding wall 412.

The protective lid 42 of the cover unit 4 has a tubular connecting segment 421, and a head segment 422 that is connected to a top end of the connecting segment 421. The connecting segment 421 is removably inserted into the retaining space 418 of the cover member 41 with a bottom end of the connecting segment 421 abutting against a top surface of the shoulder wall 413.

The insert member 43 of the cover unit 4 extends downwardly from an inner edge of the shoulder wall 413 into the receiving space 33 of the pitcher body 3. In this embodiment, the insert member 43 has a closed bottom end and defines a tubular space 431 that communicates with the retaining space 418 of the cover member 41. The tubular space 431 is adapted for retaining a cooling member (such as ice cubes (see FIG. 4)). It should be noted that, in other embodiments, the shape of the insert member 43 may vary as long as the cooling member can be retained in the insert member 43.

The filter plate 5 is adapted for filtering out the solids 22 during passage of the liquid 21 therethrough. The filter plate 5 is disposed in the receiving space 33 at a position below the pouring opening 312 of the spout 32 of the pitcher body 3. In this embodiment, the filter plate 5 has a connecting wall 51 that is removably sleeved on the lower surrounding wall 414 of the cover member 41, and a stop wall 52 that extends outwardly from the connecting wall 51 and bent downwardly.

The receiving space 33 of the pitcher body 3 has a top space portion 331 and a bottom space portion 332. The top space portion 331 is disposed above the stop wall 52 of the filter plate 5, and communicates with the top opening 311 and the pouring opening 312 of the pitcher body 3. The bottom portion 332 is disposed under the stop wall 52 of the filter plate 5. The receiving space 33 further has a ring-shaped intermediate space portion 333 defined between an outer periphery of the stop wall 52 and an inner surface of the pitcher body 33 (i.e., the outer periphery of the stop wall 52 is spaced apart from the inner surface of the pitcher body 33). The intermediate space portion 333 interconnects the top space portion 331 and the bottom space portion 332.

The filter plate 5 is formed with a plurality of through holes 521 communicating with the top and bottom space portions 331, 332. The liquid 21 is permitted to pass through the intermediate space portion 333 and the through holes 521 while the solids 22 are not allowed to pass through the intermediate space portion 333 and the through holes 521.

Referring to FIG. 4, when intending to cool down the liquid 21 inside the receiving space 33 of the pitcher body 3, a user first needs to remove the protective lid 42 from the retaining space 418 of the cover member 41 for filling the tubular space 431 with the ice cubes. With such configuration of the insert member 43, the ice cubes are not directly in contact with the liquid 21, such that the liquid 21 can be cooled without being diluted by the ice cubes after melting of the ice cubes.

When pouring the liquid 21 out of the pouring opening 312, the stop wall 52 of the filter plate 5 blocks the solids 22 so as to retain the solids 22 in the bottom space portion 332, thus only the liquid 21 can be poured out by passing through the through holes 521 and the intermediate space portion 333. In comparison with the aforesaid conventional pitcher, the solids 22 are separated from the liquid 21 by the filter plate 5 and are retained in the bottom space portion 332. Therefore, the solids 22 do not need to be manually removed by a person, thereby facilitating convenience in use and protecting the person from being choked by the solids 22 during drinking.

By virtue of the configuration of the lower surrounding wall 414 and the extension portion 417, an offset therebetween provides a space for fittingly disposing the connecting wall 51 of the filter plate 5. As such, the filter plate 5 is sleeved on the lower surrounding wall 414 with an outer surface of the connecting wall 51 being flush with an outer surface of the extension wall 417, thereby preventing accumulation of solid particles therebetween.

With the removable protective lid 42, the user can easily place ice cubes (or other heat exchanging mediums) into the tubular space 431 of the insert member 43 without having to remove the cover member 41, thereby providing convenience in use. Furthermore, the protective lid 42 also prevents dust from falling into the tubular space 431.

In this embodiment, by virtue of the C-shaped form of the engaging wall 411 of the cover member 41 and the C-shaped wall portion 415 of the upper surrounding wall 412, a relatively large flow of the liquid 21 through the pouring opening 312 can be achieved. It should be noted that, in other embodiments, if the spout 32 is not formed on the top end of the pitcher body 3 (i.e. the pouring opening 312 is not directly connected to the top opening 311), the C-shaped form of the engaging wall 411 may be omitted.

In other embodiments, the filter plate 5 is not limited to be disposed on a bottom portion of the cover member 41 (i.e., the lower surrounding wall 414), the filter plate 5 may be sleeved on a top portion of the insert member 43. As long as the filter plate 5 is disposed below the pouring opening 312 of the spout 32, separation of the solids 22 from the liquid 21 can be achieved. In this embodiment, the filter plate 5 is designed to be removable, so that the filter plate 5 can be cleaned easily.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A container adapted to contain a liquid, and adapted to separate solids from the liquid, said container comprising:
    a body defining a receiving space that is adapted for receiving the liquid therein, and having a top opening and a pouring opening that are in spatial communication with said receiving space;
    a cover unit including
        a cover member that removably covers said top opening of said body, wherein:
        said cover member of said cover unit includes
            an engaging wall engaging a top end of said body,
            an upper surrounding wall extending from a lower end of said engaging wall,
            a shoulder wall extending inwardly from said upper surrounding wall, and
            a lower surrounding wall extending downwardly from said shoulder wall, and being offset inwardly relative to said upper surrounding wall; and
        said filter plate is sleeved on said lower surrounding wall of said cover member, and
        an insert member that extends downwardly from said cover member into said receiving space; and
    a filter plate being ring-shaped, disposed in said receiving space at a position below said pouring opening of said body, removably sleeved on a bottom portion of said cover member or a top portion of said insert member,
        wherein a ring-shaped intermediate space portion is defined between an outer periphery of said filter plate and an inner surface of said body; and wherein the ring-shaped intermediate space portion and the filter plate are both adapted for filtering out the solids during passage of the liquid therethrough.

2. The container as claimed in claim 1, wherein:

said receiving space has
- a top space portion disposed above said filter plate and communicating with said top opening and said pouring opening of said body, and
- a bottom space portion disposed under said filter plate; and said filter plate is formed with a plurality of through holes, and the liquid is permitted to pass through said through holes while the solids are not allowed to pass through said through holes.

3. The container as claimed in claim 1, wherein:

said pouring opening is connected to said top opening;

said engaging wall of said cover member has a C-shaped form which opens toward said pouring opening;

said upper surrounding wall has a C-shaped portion extending inwardly from said lower end of said engaging wall, and having a C-shaped form that opens toward said pouring opening of said body, a ring portion extending inwardly from said C-shaped portion, and an extension portion extending downwardly from an inner edge of said ring portion; and said shoulder wall extends inwardly from said extension portion of said upper surrounding wall.

4. The container as claimed in claim 1, wherein said filter plate has:
- a connecting wall sleeved on said lower surrounding wall of said cover member; and
- a stop wall extending outwardly from said connecting wall and bent downwardly.

5. The container as claimed in claim 1, wherein:

said upper surrounding wall of said cover member cooperates with said shoulder wall to define a retaining space; and said cover unit further includes a protective lid having a connecting segment that is removably inserted into said retaining space, and a head segment that is connected to a top end of said connecting segment.

6. The container as claimed in claim 1, wherein said insert member defines a tubular space adapted for retaining a cooling member.

* * * * *